United States Patent [19]

Hino et al.

[11] 3,872,505

[45] Mar. 18, 1975

[54] AUTOMATIC CARTRIDGE CHANGER

[75] Inventors: Tetsuo Hino; Eiji Minami; Isao Kozu; Hidetoshi Kurihara, all of Osaka, Japan

[73] Assignee: Matsushita Electric Industrial Co., Ltd., Osaka, Japan

[22] Filed: June 14, 1972

[21] Appl. No.: 262,470

[30] Foreign Application Priority Data

June 16, 1971 Japan ............................ 46-43467
June 16, 1971 Japan ............................ 46-43487

[52] U.S. Cl. ............................................ 360/92
[51] Int. Cl. ............................................ G11b 5/00
[58] Field of Search ............... 274/4 F; 179/100.2 Z; 340/162; 40/78.05, 68.4; 270/10.1; 352/6–8; 318/674, 673; 353/25

[56] References Cited

UNITED STATES PATENTS

| | | | |
|---|---|---|---|
| 2,944,202 | 7/1960 | Bonaccorsi et al. | 318/663 |
| 3,256,473 | 6/1966 | Simopoulos et al. | 318/674 |
| 3,652,155 | 3/1972 | Scheibel | 353/25 |
| 3,698,722 | 10/1972 | Ban | 274/4 F |
| 3,733,122 | 5/1973 | Szymber | 353/25 |
| 3,749,410 | 7/1973 | Britz | 274/4 F |
| 3,752,483 | 8/1973 | Olliges et al. | 274/4 F |
| 3,774,915 | 11/1973 | Kozu et al. | 274/4 F |
| 3,778,066 | 12/1973 | Teruuchi | 274/4 F |

*Primary Examiner*—Harry N. Haroian
*Attorney, Agent, or Firm*—Wenderoth, Lind & Ponack

[57] ABSTRACT

An automatic cartridge changer comprising a rotary tray for storing a plurality of cartridges having numerical codes, a tape player for the playback of the cartridges, tray driving means for rotating the rotary tray, and index means for restricting the rotation of the rotary tray so as to position a selected single cartridge at a first position. Cartridge exchanging means transports the cartridge from the first position to a second position to engage the cartridge with the tape player. Selecting means is manually operable to select a numerical code. A first voltage coder produces a first voltage value corresponding to the numerical code. A second voltage coder produces a second voltage value corresponding to the selected cartridge. A voltage comparator makes comparison between the first and second voltage values. Control means actuates the tray driving means to rotate the rotary tray when the first and second voltage values are different, and initiates the index means to stop the rotation when the first and second voltage values are the same.

7 Claims, 5 Drawing Figures

AUTOMATIC CARTRIDGE CHANGER

FIELD OF THE INVENTION

This invention relates to an automatic cartridge changer, and more particularly to a cartridge changer capable of successively and selectively playing back a plurality of cartridges automatically.

Recently, an apparatus has been developed for successive and selective playback of tape cartridges in which music is recorded. Such an apparatus has a complex construction and it is very expensive because a large number of selective memory devices and various operation controllers are required. Therefore, it has been desired to develop an automatic cartridge changer capable of successively and selectively playing back cartridges with a simple construction and an easy method of operation. Particularly when the cartridge changer is used with a car stero player, a small size and the capability of remote control of the changer are required.

Therefore, an object of this invention is to provide a new and improved cartridge changer capable of successively and selectively engaging a plurality of cartridges from a rotary tray with the tape player.

Another object of this invention is to provide an improved cartridge changer having a simple selecting means manually operable so as to select a numerical code corresponding to a single cartridge to be selected and to be played back.

Still another object of this invention is to provide an improved cartridge changer comprising a first voltage coder for producing a first voltage having a value corresponding to a numerical code, a second voltage coder for producing a second voltage having a value corresponding to a selected compartment in the rotary tray, and a voltage comparator for detecting coicidence of the first voltage value with the second one and thereby for controlling the playback operation.

A further object of this invention is to provide an improved cartridge changer having a novel control circuit which includes a detecting switch for detecting the termination of one cycle of operation and for changing the selecting means automatically to a next numerical code so as to playback the cartridges successively.

Still further object of this invention is to provide an improved cartridge changer having a novel control circuit which includes detecting means for detecting the change of the numerical code and thereby for exchanging immediately the cartridge to one corresponding to the changed numerical code.

Yet another object of this invention is to provide an improved cartridge changer having novel control circuits by which the operation of the changer can be remotely controlled.

Yet further object of this invention is to provide an improved cartridge having novel control circuits which include a controller for successive step playback operation of the compartments and an indicator for indicating the numerical code corresponding to the cartridge being played back.

BRIEF DESCRIPTION OF THE DRAWINGS

This invention will be better understood by reference to the following description when considered in connection with the accompanying drawings of illustrative embodiments wherein.

DETAILED DESCRIPTION OF THE INVENTION

Figure 1:
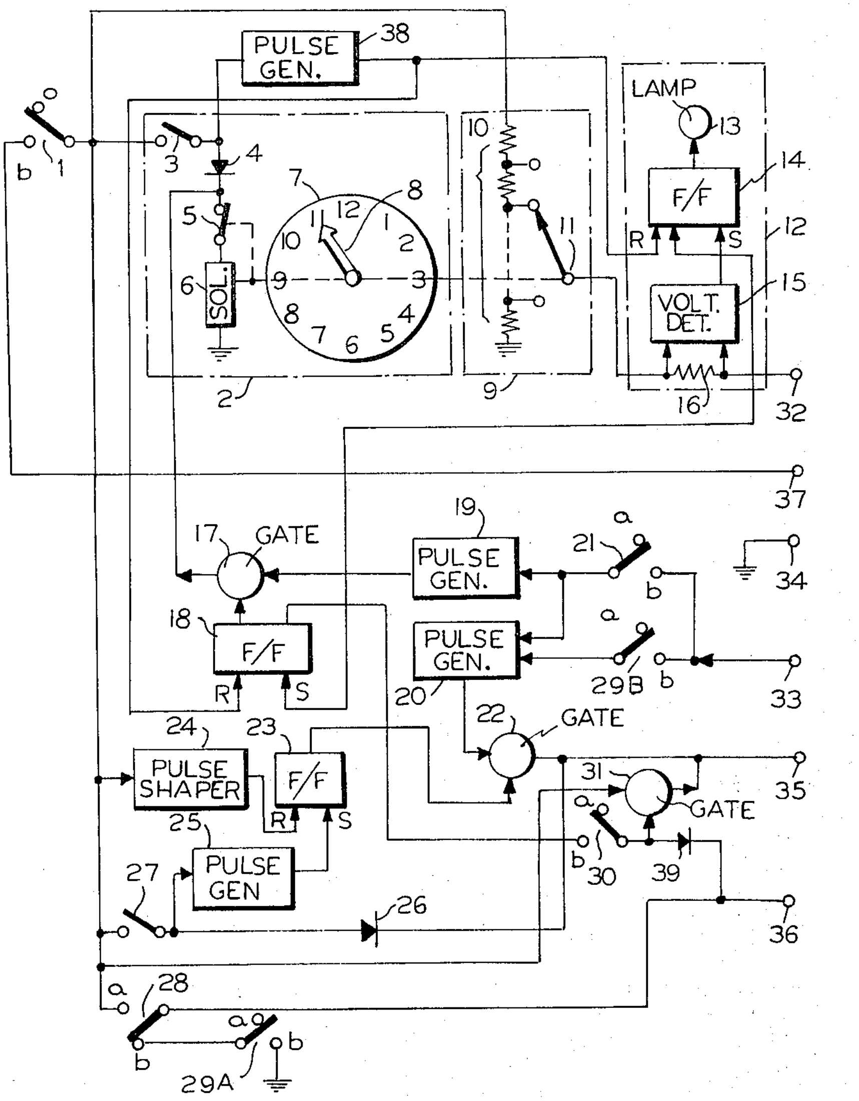
FIG. 1 is a schematic diagram showing an embodiment of a selection control circuit according to this invention.

In FIG. 1, the construction of one embodiment of a selection control circuit according to this invention is shown in diagrammatic form. The selection control circuit is comprised of selecting means 2, a first voltage coder 9, an indicating circuit 12, a start or stop control circuit, a rejection control circuit, a successive playback control circuit, a continuous playback control circuit, and instantaneous exchange detecting means. Power is supplied to the circuit through a terminal 37 and is switched on or off by a switch 1.

The selecting means 2 comprises a selection switch 3 which is manually operable to select a numerical code corresponding to a single cartridge desired to be played back, a diode 4, a switch 5 which is normally closed, a solenoid 6, a dial 7 which has a plurality of numerical codes thereon each corresponding to one of the cartridges, and an indicating needle 8. Upon the energization of the solenoid 6, the switch 5 and the indicating needle 8 are driven jointly, so that the numerical code indicated by the indicating needle 8 is advances step by step when the selection switch 3 is switched on.

The first voltage coder 9 comrpises a first voltage divider 10 for producing a plurality of voltage values corresponding to each of the numerical codes of the dial 7, and a scanning switch 11 having a common contact and a plurality of contacts corresponding to each one of said voltage values. The scanning switch 11 is jointly driven with the operation of the selecting means 2, and produces a first voltage value at the common contact corresponding to a numerical code selected by the selecting means 2.

The indicating circuit 12 indicates the selecting condition of a single cartridge corresponding to the numerical code selected by the selecting means 2, and comprises a lamp 13, a flip-flop circuit 14 for memorizing a detection, a first voltage detector 15 and a first resistor 16 which is coupled between the common contact of the switch 11 and a terminal 32.

The start or stop control circuit comprises a start or stop operation switch 27 and a diode 26. The rejection control circuit is comprised of a rejection switch 28, the common contact of which is connected to a terminal 36.

The successive playback control circuit provides an operation of successive playback of the cartridges, and comprises a selection memory flip-flop 18 for memorizing the selected condition of the single cartridge corresponding to the numerical code, a successive step gate 17, a successive pulse generator 19, the output pulse from which is supplied to the selecting means 2 through the gate 17, a continuous pulse generator 20, a successive playback switch 21, a start gate 22, a continuous memory flip-flop 23, a pulse shaper 24 and a start pulse generator 25. The output pulse from the start gate 22 and the signal from the switch 27 through the diode 26 are led to a terminal 35.

The continuous playback control circuit provides an operation of playing back the single cartridge continuously and repeatedly, it is comprised of ganged switches 29A and 29B, the continuous pulse generator 20 and the start gate 22. A terminal 33 is connected to contacts b of switches 21 and 29B which are normally opened. of both of the switches 21 and 29B.

The instantaneous exchange detecting means is comprised of the selection memory flip-flop 18, an instantaneous exchanging switch 30, a start holding gate 31, the output from which is connected to the terminal 35, and a diode 39 for leading the signal from the common contact of the switch 30 to the terminal 36.

A reset pulse generator 38 is provided for resetting the detection memory flip-flop 14 and the selection memory flip-flop 18 when the switch 3 is switched on for selecting the numerical code of the selecting means 2.

Terminal 34 is connected to the grounded terminal of the power source. Terminals 32, 33, 34, 35, 36 and 37 are extension terminals for remote control and are connected to terminals 132, 133, 134, 135, 136 and 137, respectively of a playback control circuit shown in FIG. 2.

Figure 2:
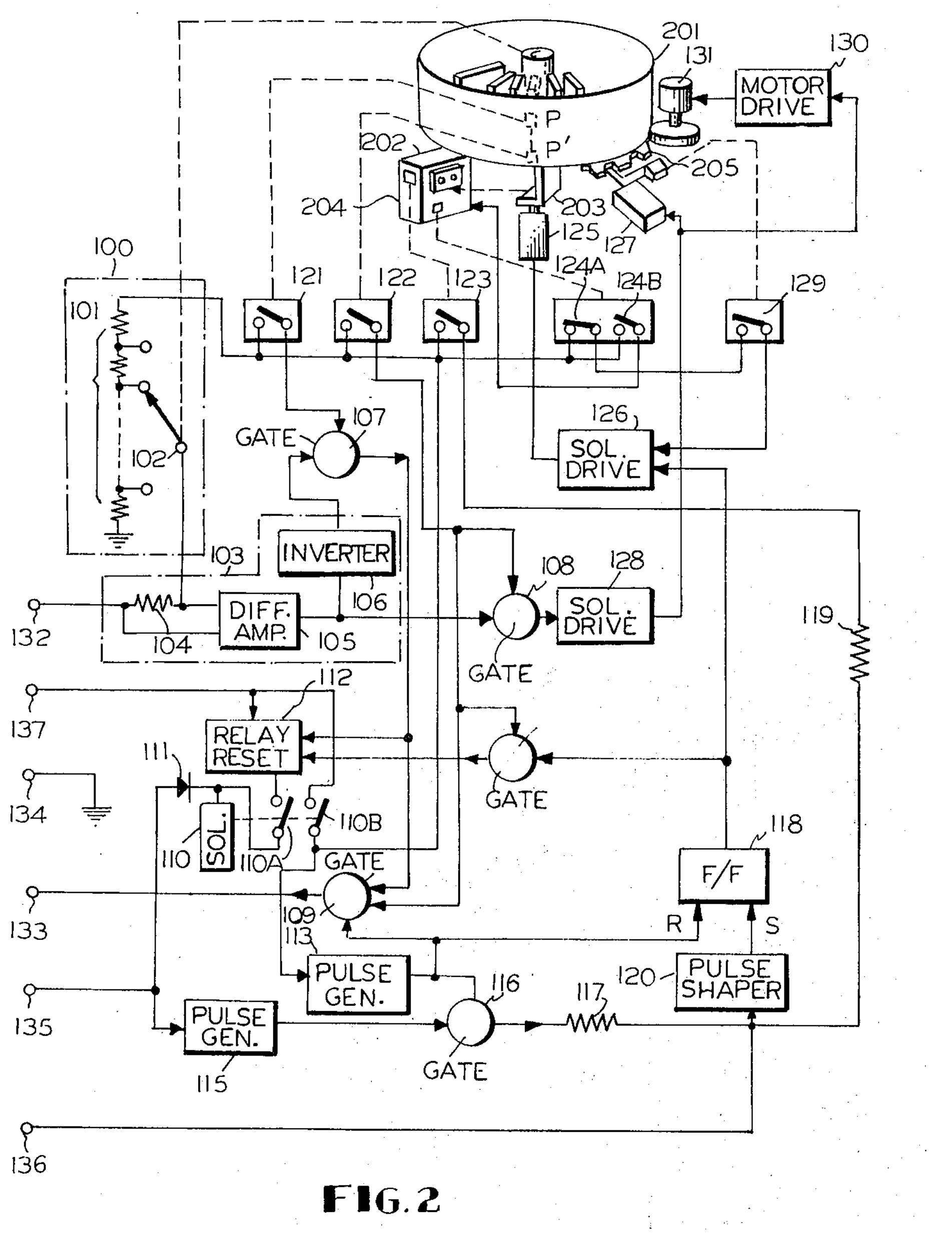
FIG. 2 is a schematic diagram showing an embodiment of a playback control circuit according to this invention.

In FIG. 2, the construction of an embodiment of the playback control circuit of the cartridge changer according to this invention is shown in diagrammatic form. The playback control circuit is comprised of a second voltage coder 100, a voltage comparator 103, a start relay circuit, a rotary tray 201 having a plurality of compartments for storing a plurality of cartridges, a tape player 204 having a magnetic head and tape moving means for the playback of the cartridges, tray driving means for rotating the rotary tray, index means for restricting the rotation of the rotary tray 201, cartridges exchanging means, a cartridge exchange detecting switch 122, tape end detecting means, a cartridge detecting circuit, a sucessive triggering pulse gate 109, and control means responsive to the voltage comparator 103 for controlling the rotation of the rotary tray 201.

The second voltage coder 100 comprises a second voltage divider 101 for producing a plurality of voltage values corresponding to each one of the compartments of the rotary tray 201 and a scanning switch 102 which has a plurality of contacts corresponding to each one of the compartments and a common contact, and which is jointly driven with the rotation of the rotary tray 201.

The voltage comparator 103 comprises a second resistor 104, a second voltage detector 105 which is composed of a voltage differential amplifier for amplifying the voltage obtained across the second resistor 104, and a voltage inverter 106.

The start relay circuit comprises a relay 110 having contacts 110A and 110B which are normally opened, a relay resetting circuit 112 and a diode 111.

Each of the compartments of the rotary tray 201 has a numerical code. The driving means comprises a tray driving motor 131 and a motor driving circuit 130. The index means comprises a solenoid 127 and recesses 205 engageable with the pin of the solenoid 127. The rotation of the rotary tray 201 is restricted by the index means, so that a selected compartment of the rotary tray 201 is positioned at a first position indicated by references p-p′ in FIG. 2, from which the single cartridge 202 in the selected compartment can be transported to the tape player 204.

The cartridge exchanging means transports the cartridge in the selected compartment from the first position to a second position in the tape player 204, it comprises an exchanging mechanism 203, a solenoid 125, a solenoid driving circuit 126, a rotation detecting switch 129 engaged with the solenoid 127, cartridge engaging detection switches 124A and 124B mounted on the tape player 204, a holding pulse generator 113, a stop pulse generator 115, a restoring gate 116, a resistor 117, a pulse shaper 120, a stop memory flip-flop 118, and a stop gate 114. The cartridge exchange detecting switch 122 is provided for detecting the termination of the return of the cartridge from the second position to the first position by the cartridge exchanging means.

The tape end detecting means comprises a tape end detecting switch 123, which is mounted on the tape player 204 for detecting the termination of the playback of the single cartridge 202, and a resistor 119. The cartridge detecting circuit comprises a stop selecting gate 107 and a cartridge detecting switch 121 mounted on an out side frame enclosing the rotary tray 201 for detecting whether the cartridge exists in the selected compartment. The successive triggering pulse gate 109 sends out the triggering pulse for continuing the operation to the selection control circuit shown in FIG. 1 through a terminal 133.

The control means responsive to the voltage comparator 103 is comprised of a solenoid driving circuit 128 and an index gate 108. The control means actuates the tray driving means so as to rotate the rotary tray 201 when the value of the voltage from the first voltage coder 9 differs from that of the second voltage coder 100, and actuates the index means so as to stop the rotation of the rotary tray 201 when the value of the voltage from the first voltage coder 9 coincides with that of the second voltage coder 100. The power source is supplied to the circuit through the terminal 137 and the grounded terminal 134.

It should be noted that although in the drawing and in the above description of the construction of the automatic cartridge changer, the detailed circuit configuration of each electric circuit means is not shown it is quite obvious from the following description that any suitable well-known circuit configuration can be used for the these means, and; description of their construction is eliminated in order to simplify the whole description.

Now, referring to FIGS. 1 and 2, the operation of the cartridge changer for this embodiment of the invention is as follows.

At first, the successive playback switch 21, the ganged switches 29A and 29B, and the instantaneous exchanging switch 30 are switched to the position *a*, respectively as shown in FIG. 1. When the switch 1 is turned on, the continuous memory flip-flop 23 is reset by a pulse produced by the pulse shaper 24 through a terminal R.

The operation of the selecting means 2 is as follows; by manually closing the selection switch 3, the solenoid 6 is energized through the diode 4 and the normally closed switch 5, and so the numerical code indicated by the indicating needle 8 is progressed one by one. By energizing the solenoid 6, the switch 5 which is driven jointly by the solenoid 6 is opened, so that the solenoid 6 is released momentarily and the switch 5 turns on again. Thus, the selecting means 2 operates step by step so as to select the numerical code on the dial 7 indicated by the indicating needle 8 when the selection switch 3 is on, and selects a numerical code corresponding to a selected compartment of the rotary tray 201 by switching off the switch 3. A first indicator comprises the dial 7 and the indicating needle 8 and is coupled to the selecting means.

A first voltage value correponding to the numerical code selected by the selecting means 2 is produced at the common contact of the scanning switch 11. Switch 11 has a plurality of contacts, each of which is provided with one of the voltage values produced by the first voltage divider 10. The common contact of the switch 11 of the first voltage coder 9 is connected to the common contact of the switch 102 of the second voltage coder 100 through the first resistor 16, the terminals 22 and 132 and the second resistor 104. Therefore, the difference voltage between the first voltage value produced by the first voltage coder 9 and the second voltage value produced by the second voltage coder 100 is supplied to the first voltage detector 15 of the indicating circuit 12 through the first resistor 16, and is supplied to the second voltage detector 105 of the voltage comparator 103 through the second resistor 104.

By switching on the selection switch 3, the detection memory flip-flop 14 is reset by a pulse generated by the reset pulse generator 38 through the terminal R, and so the indicating lamp 13 connected to the flip-flop 14 is not illuminated. The selecting memory flip-flop 18 is also reset by the pulse generated by the reset pulse generator 38 through the terminal R, and the successive step gate 17 is closed to stop the pulse in response to the output out put voltage of a terminal (+) of the flip-flop 18.

When the start or stop switch 27 is closed, the relay 110 is energized by the voltage of the power source through the diode 26, the terminals 35 and 135 and the diode 111, and it turns on the contacts 110A and 110B. Then, the relay 110 is held in the energizing state through the contact 110A and a relay resetting source circuit 112 which is normally closed. Accordingly, the power from the power is supplied to the playback control circuit through the terminal 137 and the contact 110B.

On the other hand, by turning on the switch 27, the stop pulse generator 115 is caused to generate a stop pulse, and by turning on the contact 110B, the holding pulse generator 113 is caused to generate a holding pulse having a width wider than that of the stop pulse. Therefore, the restoring gate 116 is closed to inhibit the stop pulse in response to the holding pulse. Also, in response to the holding pulse successive triggering pulse gate 109 is closed to inhibit the other signals moreover, this occurs only when the power source is switched on to the playback control circuit. The stop memory flip-flop 118 is reset by the holding pulse through a terminal R.

A second voltage value corresponding to a selected compartment of the rotary tray 201 is produced at the common contact of the scanning switch 102 which also has a plurality of contacts. Each of the contacts is provided with one of the voltage values produced by the second voltage divider 101. The first voltage divider 10 of the first voltage coder 9 and the second voltage divider 101 of the first voltage coder 100 are arranged so that the first voltage value coincides with the second voltage value when a cartridge corresponding to the numerical code selected by the selecting means 2 is positioned at the first position indicated by p-p'. From this position cartridge in the selected compartment of the rotary tray can be transported to the tape player 204.

When the cartridge corresponding to the numerical code selected by the selecting means 2 is not positioned at the first position, the first voltage value of the first voltage coder 9 differs from the second voltage value of the second voltage coder 100. Accordingly, the difference voltage between the first voltage value and the second voltage value is obtained across the first resistor 16 and the second resistor 104. The voltage detector 105 composed of the voltage differential amplifier amplifies the voltage difference obtained across the second resistor 104, and yields a second output signal.

Also, when the selected cartridge is not positioned at the first position but another catride is, the cartridge exchange detecting switch 122 is closed, and the index gate 108 is opened to pass the signal in response to the voltage of the source supplied through switch 122. The solenoid 127 is energized by the solenoid driving circuit 128 to which the output voltage of the voltage comparator 103 is supplied through the gate 108. Then, the pin of the solenoid 127 is released from the recess 205. The tray driving motor 131 is actuated to rotate the rotary tray 201 by the mtor driving circuit 130 which is driven by the solenoid driving circuit 128. The rotation detecting switch 129 engaged with the solenoid 127 is switched off by the energization of the solenoid 127.

When the cartridge corresponding to the numerical code selected by the selecting means 2 is positioned at the first position by rotating the the rotation of tray 201, the voltage obtained across the second resistor 104 becomes zero. Accordingly, the voltage from the voltage comparator 103 changes from the second output signal to a first output signal. The solenoid 127 is deenergized by the solenoid driving circuit 128, and forces its pin into the recess 205 so as to restrict the rotation of the rotary tray 201. The motor 131 is also stopped by the solenoid driving circuit 128 through the motor driving circuit 130. Therefore, the rotation of the rotary tray 201 is stopped and a selected compartment is positioned at the first position.

In response to the deenergization of the solenoid 127, the switch 129 is switched on, and the solenoid 125 is energized by the solenoid driving circuit 126 to which the voltage of the power source is supplied through the normally closed switch 124A and the switch 129. By energizing the solenoid 125, the operation of the exchanging mechanism 203 is started. The cartridge 202 in the selected compartment is transported by the exchanging mechanism 203 from the first position indicated by p-p' in the rotary tray 201 to the second position and engaged with the tape player 204. As a result of the engagement of the cartridge 202 with the tape player 204, the detection switch 124A is turned off so as to deenergize the solenoid 125 through the solenoid driving circuit 126, and the operation of the exchanging mechanism is stopped. At the same time, the switch 124B is switched on by the engagement of the cartridge 202 with the tape player so as to supply the voltage of the power source to a tape moving means and a signal amplifier (not shown), so that the cartridge 202 corresponding to the numerical code selected by the selecting means 2 is played back by the tape player 204.

In addition, when the first voltage value of the first voltage coder 9 coincides with the second voltage value of the second voltage coder 100, the first voltage detector 15 detects the change of voltage obtained across the first resistor 16 from some value to zero and turns the detection memory flip-flop 14 to the set condition through the terminal S. The indicating lamp 13 is thus illuminated by the setting of the flip-flop 14 so as to indicate the state of playback of the cartridge 202 corresponding to the numerical code. A second indicator comprises the indicating lamp 13 and the flip-flop 14 and is coupled to the first voltage detector 15.

When the selecting means 2 is operated so as to change the numerical code to another one corresponding to another compartment by turning on the selection switch 3, the first voltage detector 15 detects the change of the voltage obtained across the first resistor 16 from zero to some value according to the difference between the first voltage value and the second voltage value, and it turns the flip-flop 14 to the reset condition through the terminal R. The indicating lamp 13 is turned off by resetting the flip-flop 14 so as to indicate another cartridge has been selected during the playback of the cartridge 202. Similarly, the output voltage of the voltage comparator 103 changes from the first output signal to the second output signal according to the difference between the first voltage value and the second voltage value. But, because the switch 122 remains open gate 108 remains shut, and the cartridge 202 keeps on playing back.

When the tape end detecting switch 123 is switched on by detecting the termination of the playback of the cartridge 202, the stop memory flip-flop 118 is set by the pulse shaper 120 to which the voltage of the power source is supplied through the resistor 119 and the switch 123. The solenoid 125 is again energized by the solenoid driving circuit 126 to which the output voltage of the flip-flop 118 is provided, and the exchanging mechanism 203 is started so as to restore the cartridge 202 from the second position in the tape player 204 to the first position in the rotary tray 201. Then, the cartridge exchange detecting switch 122 is turned on by detecting the termination of the restoration of the single cartridge 202 to the selected compartment of the rotary tray 201. In addition the stop gate 114 is opened to pass the output voltage of the flip-flop 118 in reponse to the voltage of the power source supplied through the switch 122. Therefore, the relay 110 is deenergized by the relay resetting circuit 112 which opens the circuit of the contact 110A by being supplied with the output voltage of the flip-flop 118 through the gate 114. Accordingly, the operation of the cartridge changer is stopped by opening of contacts 110A, 110B. In the stopped state of the operation, the flip-flop 114 is turned to the reset condition by detecting a voltage difference between the first voltage value of the first voltage coder 9 and the second voltage value of the second voltage coder 100, and the lamp 13 is turned off to indicate the termination of playback of the single cartridge 202.

By turning the rejection switch 28 to position *a* during the playback of the cartridge 202, the stop memory flip-flop 118 is set by the pulse shaper 120 to which the voltage of the power source is supplied through the switch 28 and the terminals 36 and 136. The cartridge 202 being played back is restored to the rotary tray 201 by the same operation as described above.

If another numerical code had been selected by the selecting means 2 during the playback of the cartridge 202, another cartridge corresponding to the newly selected numerical code is positioned at the first position and is played back by the tape player 204. On the other hand, by turning on the switch 27 during the playback of the cartridge 202, the stop pulse generator 115 is triggered through the diode 26 and the terminals 35 and 135 to generate a stop pulse. Then, the stop memory flip-flop 118 is set by the pulse shaper 120 to which the stop pulse is supplied through the restoring gate 116 which is normally opened and through the resistor 117. Therefore, the cartridge 202 being played back is restored to the rotary tray 201 by the same operation as described above.

The operation in the case when there is no cartridge in the selected compartment of the rotary tray 201 is as follows; the stop selecting gate 107 is opened to pass the signal in response to the voltage of the power source supplied through the switch 121 which is turned on by detecting an absence of the cartridge in the selected compartment of the rotary tray 201. When a compartment storing a cartridge corresponding to the numerical code selected by the selecting means 2 is positioned at the first position by the rotation of the rotary tray 201, the voltage detector 105 yields a the first output signal. The, voltage obtained by the inverter 106 is supplied to the relay resetting circuit 112 through the gate 107 so as to stop the operation of the cartridge changer.

The operation of the successive playback of a plurality of cartridge stored in the compartments of the rotary tray 201 will now be described. The successive playback switch 21 is turned to the position *b*. The operation of the playback of a cartridge corresponding to a numerical code selected by the selecting means 2 is performed by the same operation as described above. Moreover, the operation of the restoration of the cartridge 202 to the rotary tray 201 after it has been played rejected is also performed by the same operation as described above.

When the cartridge exchange detecting switch 122 is turned off by the restoration of the cartridge 202 to the rotary tray 201, the voltage of the power source is supplied to the successive pulse generator 19 and to the continuous pulse generator 20 through the successive triggering pulse gate 109 which is normally opened and through, the terminals 133 and 33 and the switch 21. The selection memory flip-flop 18 has been set by the detection of the cartridge to be played back at the indicating circuit 12. The gate 17 is opened to pass a successive step pulse generated by the successive pulse generator 19. Accordingly, the selecting means 2 is changed automatically by the successive step pulse to the next numerical code. Additionally, when the switch 27 is closed to start the operation, the continuous memory flip-flop 23 is set by a pulse generated by the start pulse generator 25. The start gate 22 is opened to pass the pulse in response to the output voltage of the flip-flop 23 being set. Therefore, the relay 110 which had been deenergized by the restoration of the cartridge 202 to the rotary tray 201 is again energized by the pulse supplied from the continuous pulse generator 20 through the gate 22, terminals 35, 135 and the diode 111. By such an operation, a plurality of cartridges stored in the compartments of the rotary tray 201 are successively and automatically played back.

When the selecting means 2 is operated so as to change the successive numerical code to a skipped numerical code corresponding to a skipped compartment by turning on the selection switch 3 during the successive playback of the cartridge, the gate 17 is closed to stop the successive step pulse in response to the output voltage of the (+) terminal of the flip-flop 18 which is reset by turning on the selection switch 3. In this case, after the restoration of the cartridge to the rotary tray 201, the selecting means 2 is not changed to the next numerical code but stays at the skipped numerical code. A cartridge corresponding to the skipped numerical code selected by the selecting means 2 is positioned at the first position and is played back by the tape player 204. After that, the operation of the successive playback of a plurality of cartridges is again performed.

The, the operation of the continuous and repeating playback of a single cartridge corresponding to a numerical code selected by the selecting means 2 will now be described. The ganged switches 29A and 29B are turned to the position *b*. The of the playback cartridge corresponding to the numerical code is performed by the same operation as described above. Even if the tape end detecting switch 123 is switched on by detecting the termination of the playback of the cartridge 202, the stop memory flip-flop 118 is not set but stays at the reset condition because the terminal 136 is grounded by the switch 29A through the terminal 36 and the rejection switch 28. Therefore, the cartridge 202 being played back stays at tape player 204. And, by a reversing mechanism (not shown) provided with the tape player 204, the cartridge 202 is continuously played back by alternately changing the direction of tape movement.

When the selecting means 2 is operated so as to change the numerical code to another during the playback of the cartridge 202 and the rejection switch 28 is then turned to the position *a*, the cartridge 202 being played back is restored to the rotary tray 201 by setting the stop memory flip-flop 118 through the terminals 36 and 136 and the pulse shaper 120. By the same operation as described above in the successive playback of the single cartridge, another cartridge corresponding to the newly selected numerical code is positioned at the first position and is played back continuously by the tape player 204.

The operation of the instantaneous exchanging of a cartridge corresponding to another numerical code selected by the selecting means 2 will now be described. The instantaneous exchanging switch 30 is turned to the position *b*. When the selecting means 2 is operated so as to change the numerical code to another one during the playback of the single cartridge 202, the flip-flop 18 is reset in response to a pulse generated by the reset pulse generator 38, and yields some voltage at an output terminal (−). The stop memory flip-flop 118 is set by the pulse shaper 120 to which the voltage at the output terminal (−) of the flip-flop 18 is supplied through the switch 30, the diode 39 and terminals 36 and 136. The restoration of the cartridge is performed by the same operation as described above. Additionally, the start holding gate 31 is opened in response to the voltage of the output terminal (−) of the flip-flop 18, and the voltage of the power source is supplied to the relay 110 through the gate 31 the terminals 35 and 135 and the diode 111. Accordingly, the relay 110 is again energized and the playback of another cartridge is started by the same operation as described above. Thus, the cartridge 202 being played back is immediately restored from the second position to the first position to exchange the cartridge for another cartridge corresponding to another numerical code.

The following description concerns the operation of a selection switch circuit having a plurality of selection switches and a pluralitay of memory devices, both corresponding to each of the compartments of the rotary tray for instructing the selection of a plurality of numerical codes at the selecting means.

Figure 3:
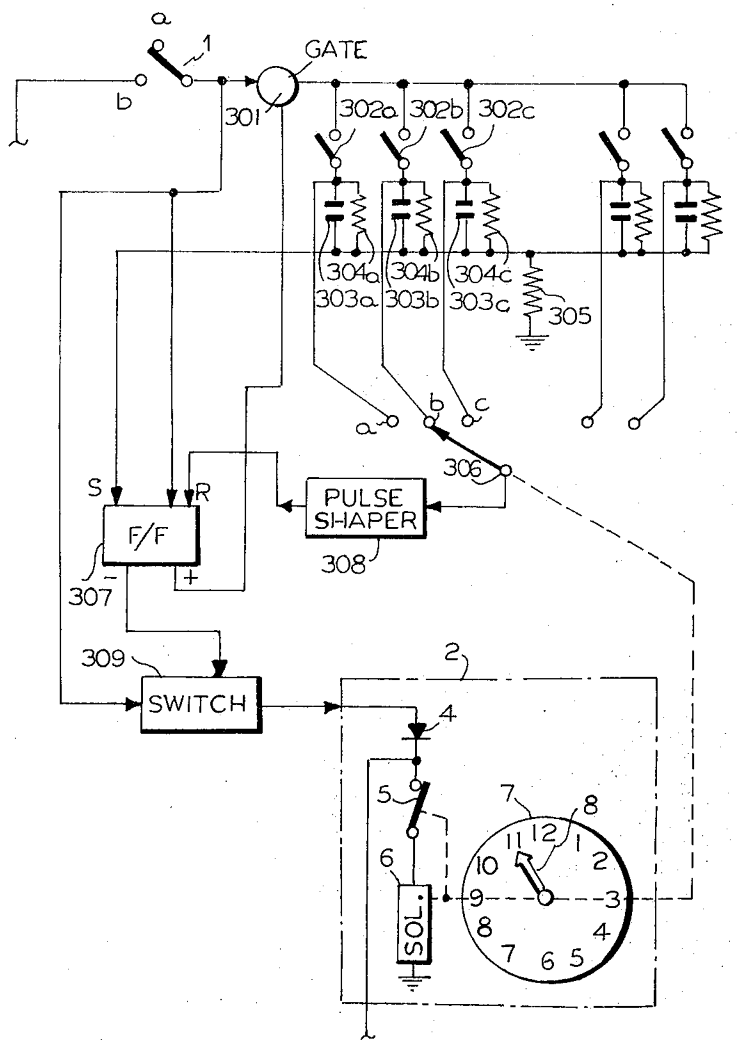
FIG. 3 is a schematic diagram showing an embodiment of a selection switch circuit as the selecting means according to this invention.

In FIG. 3, the construction of an embodiment of a selection switch circuit to be used as the selecting means according to this invention is shown in diagrammatic form. The selection switch circuit is comprised of a plurality of selection switches 302*a*, 302*b*, 302*c* . . ., a plurality of memory devices, each of which is composed of a capacitor 303 and a discharge resistor 304, a detecting resistor 305, a scanning switch 306 and scanning switch driving means.

The plurality of selection switches 302*a*, 302*b*, 302*c* . . ., each of which corresponds to one the compartments of the rotary tray 201, are provided for selecting a desired cartridge to be played back. A plurality of memory devices 303*a*, 303*b*; 303*c* . . . are provided for memorizing instructions to be given to selecting means 2. Each of these devices corresponds to and is coupled to one of the selection switches 302. Capacitors 303 and resistors 304 associated with corresponding selection switches 302 are indicated by suffixes *a*, *b*, *c*, . . . The detecting resistor 305 is coupled between a common terminal of the capacitors 303*a*, 303*b*, 303*c*, . . . and resistors 304*a*, 304*b*, 304*c*, . . . and a ground. The scanning switch 306 has a plurality of contacts *a*, *b*, *c*, . . ., each of which is coupled to the common contact of the switches 302, and scans the memory devices 303 successively. The scanning switch driving means comprises a selection control flip-flop 307 for holding the selecting state, a selection gate 301, a pulse shaper 308 and a switching device 309.

Referring to FIG. 3, the operation of the selection switch circuit is for an embodiment of the invention is described in as follows. Power is supplied to the circuit by turning on the switch 1. At that moment, the selection control flip-flop 307 is reset by the voltage of the power source through the terminal R. At the reset condition of the flip-flop 307, the switching device 309 is closed in response to a voltage at the terminal (−) of flip-flop 307, to remove the voltage of the power source from the selecting means 2 in response to a voltage of the output terminal (−) of the flip-flop 307. And, the selection gate 301 is opened to pass the voltage of the power source to the selection switches 302 in response to the voltage of the output terminal (+) of the flip-flop 307.

When one of the selection switches 302 is turned on, the current flows through the resistor 305 and the capacitor 303 associated with the selection switch 302. The flip-flop response is set by the voltage drop obtained across the resistor 305 selecting being stored through the terminal *s*. Then, the gate 301 is closed to block the voltage, and the switching device 309 is opened to pass the voltage respectively in responer to the voltage of output terminals (+) and (−) of the flip-flop 307. Therefore, the selecitng means 2 operates successively to select the numerical code. And, the scanning operation of the scanning switch 306 is started by hervis jointly driven with the selecting means 2 so as to scan the capacitors 303, successively. The voltage stared in each of the capacitors is obtained successively at the common contact of the scanning switch 306. The pulse shaper 308 generates a reset pulse for the flip-flop 307 in response to a presence of the voltage at the common contact of the scanning switch 306, that is the presence of the memorization of the memory devices 303 which is set by one of the selection swtiches 302. Thus, the switching device 309 is again closed to block the voltage voltage, and the gate 301 is again opened to pass the voltage. Therefore, the scanning operation is stopped by detecting the presence of the memorization. By such an operation, the selecting means 2 is automatically set to a numerical code corresponding to a selection switch manually operated. The value of resistors 304 is determined so as to maintain the capacitors 303 charged for time necessary to set the numerical code to the selecting means 2.

The automatic cartridge changer is constructed so as to be useful for the playback of a cartridge selected from a plurality of cartridges. However, this invention is not limited to such use but is also useful for record or record-playback operation.

Instructions to select the cartridge to be played back are performed by detecting the coincidence of the first voltage value corresponding to the numerical code with the second voltage value corresponding to one of the compartments. As a result, any voltage variation from the power source and any noise in the source will have no effect on the control accuracy because the voltage variation and noise are present to the same degree in both the first voltage value and the second voltage value. Therefore, the cartridge changer of this invention operates stably and reliably to select the cartridge to be played back and can be easily remotely controlled by extending the electric connection between the selection control circuit shown in FIG. 1 and the playback control circuit shown in FIG. 2.

Moreover, the first resistor coupled to the first voltage detector and the second resistor coupled to the second voltage detector are connected in series with each other between the first voltage coder and the second voltage coder, so that detections of both the first voltage and the second voltage are performed at a common connection.

Figure 4:
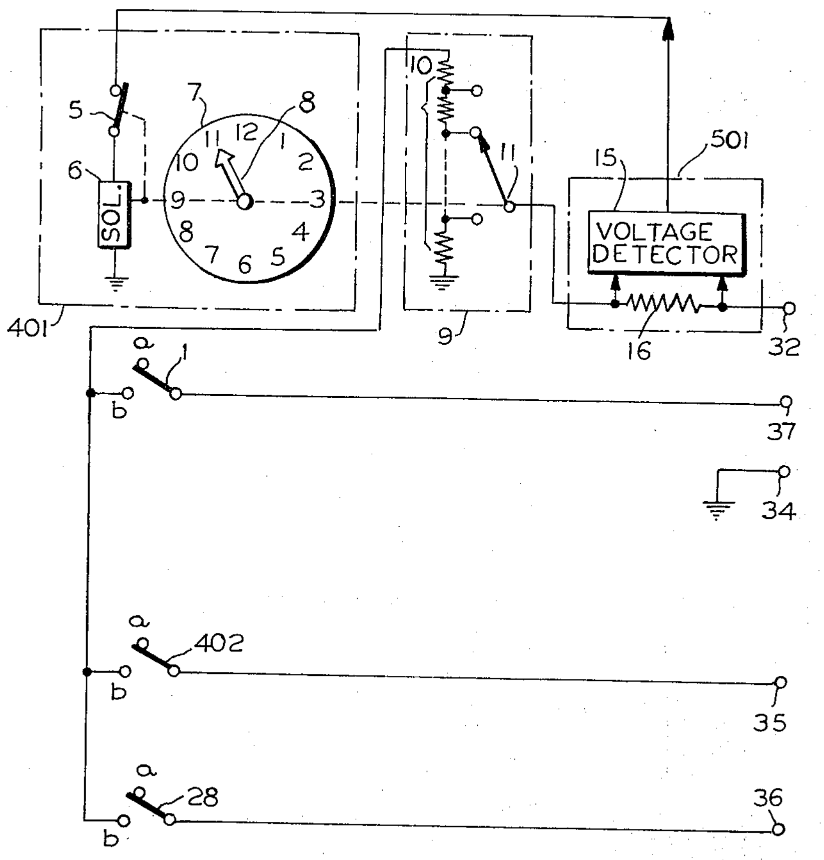
FIG. 4 is a schematic diagram showing an embodiment of an indication control circuit according to this invention.

In FIG. 4 the construction of an embodiment of the indication control circuit according to this invention is shown in diagrammatic form. The indication control circuit is comprised of an indicator 401, a first voltage coder 9, indication control means 501 and an operation control circuit. The indicator 401 is the same means as the selecting means 2 shown in FIG. 1 except that the selection switch 3 and the diode 4 have been removed. The first voltage coder 9 is the same as that shown in FIG. 1. The indication control means 501 comprises a first resistor 16 and a voltage detector 15 which are the same as the devices shown in FIG. 1. The operation control circuit is comprised of a switch 1, a start switch 402 and a rejection switch 28.

Figure 5:
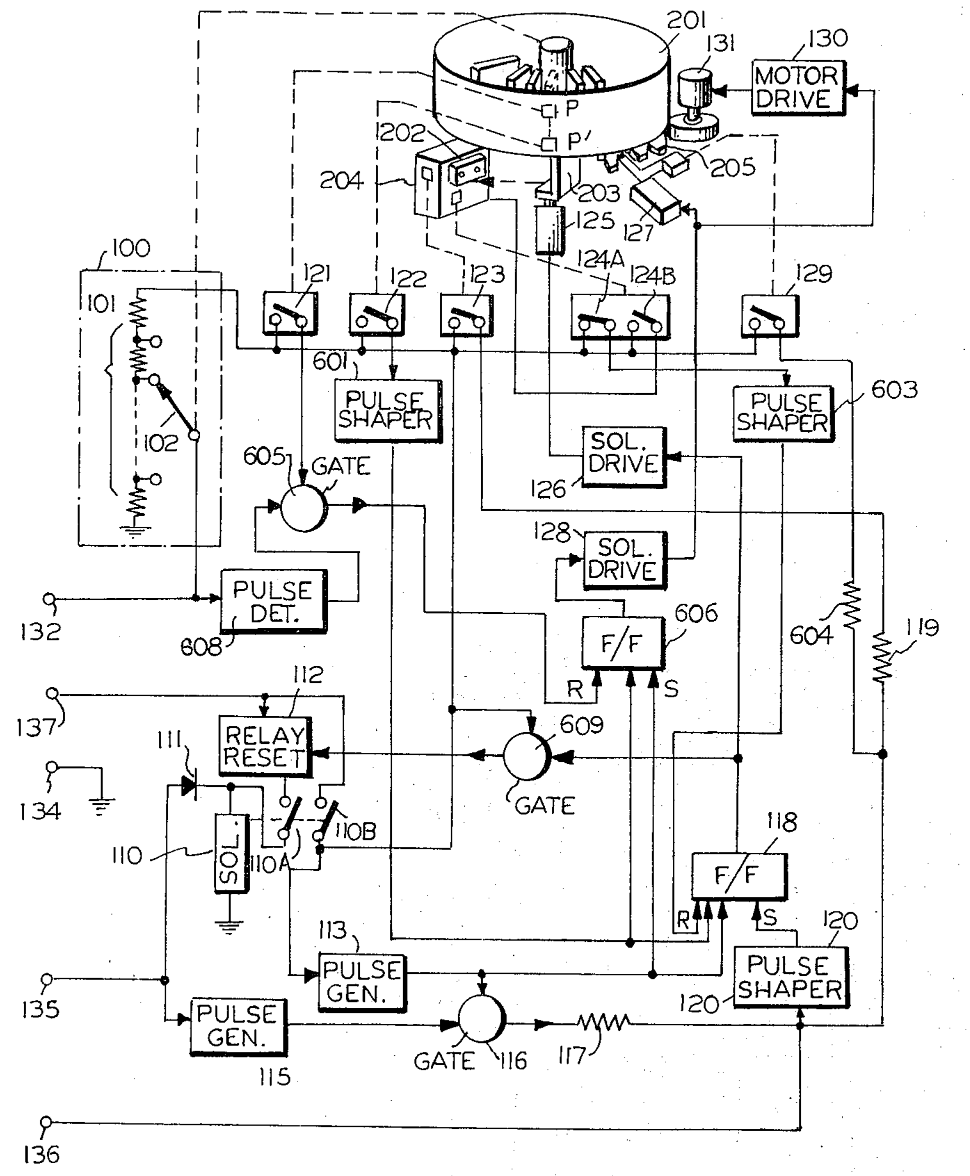
FIG. 5 is a schematic diagram showing another type of playback control circuit according to this invention.

In FIG. 5, the construction of another type of playback control circuit according to this invention is shown in diagrammatic form. The main means of this circuit are the same as those shown in FIG. 2. The playback control circuit shown in FIG. 5 is comprised of a second voltage coder 100, a start relay circuit, a rotary tray 201, a tape player 204, tray driving means, index means, cartridge exchanging means, a cartridge exchange detecting switch 122, successive step detecting means, tape end detecting means, a cartridge detecting circuit and control means.

The second voltage coder 100 is the same as that shown in FIG. 2. The start relay circuit further includes a relay holding gate 609 in the same circuit as shown in FIG. 1. The rotary tray 201, the tape player 204, the tray driving means and the index means are the same as those shown in FIG. 1. The cartridge exchanging means comprises the same devices as those shown in FIG. 1 except the stop gate 114 has been removed and the resistor 604 has been added. The cartridge exchange detecting switch 122 is also the same as that shown in FIG. 1. The successive step detecting means detects the successive step change of the second voltage coder 100 according to each step rotation of the rotary tray 201, and is comprised of a step pulse detector 608. The tape end detecting circuit is the same as that shown in FIG. 1. In the cartridge detecting circuit, the stop selecting gate 107 is replaced by a tray stop gate 605. The control means is comprised of a solenoid driving circuit 128 and a tray driving flip-flop 606.

Operations of the indication control circuit shown in FIG. 4 and the playback control circuit shown in FIG. 5 are carried out based on the comparison of the first voltage value produced by the first voltage coder 9 corresponding to the numerical code and the second voltage value produced by the second voltage coder 100 corresponding to one of the compartments of the rotary tray 201.

Now referring to FIGS. 4 and 5, the operation of the cartridge changer for this embodiment of the invention is described as follows. By switching on the switch 1, the first voltage coder 9 produces a voltage value corresponding to a numerical code of indicator 401. When switch on the state of turning on the switch 402 is turned to the position *b*, the start relay 110 is energized by the voltage of the power source supplied through the terminals 35 and 135, the diode 111 and the switch 402. The voltage of the power source is supplied to the playback control circuit through the contact 110B. The stop memory flip-flop 118 is reset by the holding pulse in the same manner as described hereinbefore referring to FIG. 2. At the same time, the tray driving flip-flop 606 is set by the holding pulse generated by the holding pulse generator 113 through the terminal *s*. The solenoid driving circuit 128 driver by the flip-flop 606 energizes the solenoid 127 to release the pin from recess 205 and actuate the tray driving motor 131 through the motor driving circuit 130 to rotate the rotary tray 201.

The second voltage coder 100 produces a second voltage value corresponding to a selected compartment of the rotary tray 201. By each step rotation to a next compartment of the rotary tray 201, a step voltage change is produced by the second voltage coder 100. The step pulse detector 608 detects the step voltage change and turns the flip-flop 606 to the reset condition thrugh the tray stop gate 605 which is normally opened. Accordingly, the solenoid 127 is deenergized by the solenoid driving circuit and forces its pin into the recess 205 so as to position the next compartment at the first position. The switch 129 is switched on by deenergizing the solenoid 127 and turns the flip-flop 118 to the set condition through the resistor 604 and the pulse shaper 120. The operation of the exchanging mechanism 203 is started by energizing the solenoid 125 through the solenoid driving circuit 126.

When the cartridge 202 is engaged with the tape player 204, the detection switch 124A is turned off so as to reset the flip-flop 118 through the pulse shaper 603 and the terminal R. By turning on the switch 124B, the tape player 204 starts to playback the cartridge 202. While the cartridge is playing, the first voltage value differs from the second voltage value, and, the voltage difference between them is obtained across the first resistor 16. The voltage detector 15 yields an output voltage which actuates the indicator 401 to successively progress the numerical code. The first voltage value of the first voltage coder 9 changes according to the progressing operation of the indicator 401. By the coincidence of the first voltage value with the second voltage value, the voltage detector 15 yields a first output signal and stops the progressing operation of the indicator 401. Therefore, the numerical code corresponding to the next selected cartridge to be played back is indicated by the detector 401.

When the tape end detecting switch 123 detects the termination of the playback of cartridge 202, the restoration of the cartridge is performed by setting the flip-flop 118 through the resistor 119 and the pulse shaper 120 as described hereinbefore in connection with FIG. 2. The cartridge exchange detecting switch 122 detects the termination of the restoration of the cartridge 202 and turns the flip-flop 118 to the reset condition. At the same time, the flip-flop 606 is turned to the set condition through the pulse shaper 601, and initiates the tray driving means to rotate the rotary tray 201 as described above. Therefore, the next compartment of the rotary tray 201 is positioned at the first position by the index means in response to the detection of each step rotation by the successive step detecting means. Thus, a plurality of cartridge stored in the compartments are played back successively, and the numerical code corresponding to the selected compartment is indicated by the indicator.

The rejecting operation produced by the switch 28 is the same operation as described in connection with FIG. 1. When the switch 402 is turned off during the playback of the cartridge 202, the flip-flop 118 is reset in response to the pulse generated by the stop pulse generator 115 through the normally opened gate 116, the resistor 117 and the pulse shaper 120. Then, the cartridge 202 being played back is restored from the second position in the tape player 204 to the first position in the rotary tray 201. The flip-flop 118 is reset by the switch 122 which detects the termination of the restoration. The relay resetting circuit 112 is opened by the flip-flop 118 through the relay holding gate 609 so as to deenergize the relay 110. Thus, the operation of the cartridge changer is stopped.

It will be apparent from the foregoing that while a particular form of this invention has been illustrated and described, various modifications can be made without departing from the spirit and scope of the invention as defined by the appended claims.

What we claim is:

1. An automatic cartridge changer comprising:

a rotary tray having a plurality of compartments for storing a plurality of cartridges, each of said compartments having a numerical code;

a tape player having a magnetic head and a tape moving means for the playback of said cartridges;

a tray driving means coupled to said rotary tray for rotating said rotary tray;

an index means engageable with said rotary tray for restricting rotation of said rotary tray so as to position a selected compartment at a first position;

a cartridge exchanging means for transporting a cartridge from said first position to a second position so as to engage said cartridge with said tape player and to play back said cartridge by said magnetic head;

a selecting means which operates in a step-wise manner to advance numerical codes when supplied with a voltage from an electric power source and stops its operation so as to select a numerical code when the voltage thereto from the electric power source is disconnected;

a switch connected between said selecting means and the power source for controlling the supply of electric power to said selecting means;

a first voltage coder coupled to said selecting means for producing a first voltage corresponding to the numerical code selected by said selecting means;

a second voltage coder coupled to said rotary tray for producing a second voltage corresponding to the numerical code of the selected compartment of said rotary tray when the selected compartment is positioned at said first position;

a voltage comparator for comparing the value of said first voltage of said first voltage coder with that of said second voltage of said second voltage coder;

a cartridge exchange detecting' switch operatively coupled to said rotary tray for detecting the termination of the restoring of said cartridge by said cartridge exchanging means; and a control means operatively coupled and receiving a first input signal relating to the termination of the restoring of said cartridge by said cartridge exchanging means for actuating said tray driving means, and also receiving a second input signal, relating to the termination of the rotation of said rotary tray to a selected position, for initiating said index means, whereby said rotary tray can be automatically rotated for selecting a next cartridge to be played back in response to the temrination of the playback of said cartridge and, if necessary, a cartridge to be played back can be manually selected by manually operating said switch.

2. An automatic cartridge changer according to claim 1, wherein said cartridge exchange detecting switch is coupled to said selecting means and changes said selecting means automatically to a next numerical code by detecting the termination of restoring of the cartridge by said cartridge exchanging means, whereby an output signal of said voltage comparator is changed from one of a first output signal indicating the coincidence of said first voltage with said second voltage to a second output signal indicating a lack of correspondence of said first voltage with said second voltage and from said second output signal to said first output signal, said second output signal of said voltage comparator being used as said first input signal to said control means, and said first output signal of said voltage comparator being used as said second input signal to said control means, the cartridges corresponding to the numerical code selected manually or successively through said selecting means being automatically played back.

3. An automatic cartridge changer according to claim 1, wherein said cartridge changer further comprises a first indicator coupled to said selecting means for indicating the numerical code selected by said selecting means and a second indicator coupled to said voltage comparator for indicating the playing back state of the cartridge corresponding to the selected numerical code in response to said first output signal of said voltage comparator and for indicating the playing back state of the cartridge differing from the selected numerical code in response to said second output signal of said voltage comparator.

4. An automatic cartridge changer according to claim 3, wherein said cartridge changer further comprises a successive step detecting means for detecting one step rotation of said rotary tray, whereby said control means actuates said tray driving means to rotate said rotary tray directly in response to the detection by said cartridge exchange detecting switch of said first input signal and also indicates to said index means to stop the rotation of said rotary tray in response to the detection of the one step rotation by said successive step detecting means, the cartridges stored in said rotary tray being thereby successively played back.

5. An automatic cartridge changer according to claim 1, wherein said cartridge changer further comprises an instantaneous exchange detecting means for detecting a change of the numerical code of said selecting means to another numerical code and for activating said cartridge exchanging means to restore said cartridge from said second position in said tape player to said first position in said rotary tray, whereby said cartridge under playback of said player is immediately restored from said second position to said rirst position and said cartridge is exchanged by another cartridge.

6. An automatic cartridge changer according to claim 1, wherein said voltage comparator further comprises a first voltage detector having a first resistor coupled to said second indicator for detecting the coincidence of said first voltage with said second voltage so as to indicate the state of playback of said cartridge and a second voltage detector having a second resistor coupled to said control means for detecting the coincidence of said first voltage with said second voltage so as to control the rotation of said rotary tray, said first resistor and said second resistor being connected in series with each other between said first voltage coder and said second voltage coder, whereby both detections of both said first voltage detector and said second voltage detector are performed in a common connection.

7. An automatic cartridge changer according to claim 1, wherein said selecting means further comprises: a plurality of selection switches, each corresponding to one of said compartments of said rotary tray for selecting a cartridge to be played back; a plurality of memory devices, each being correspondingly coupled to one of said selection switches for memorizing instructions to select a numerical code; a scanning switch for scanning said memory devices successively, said scanning switch being coupled with said first voltage coder to produce the first voltage; and a scanning switch driving means for starting scanning operation of said scanning switch in response to the operation of said selection switches and for stopping said scanning operation upon detecting the memory of the instruction in said memory device provided by one of said selection switches.

* * * * *